US00RE43347E

(19) United States
(12) Reissued Patent
Grether

(10) Patent Number: US RE43,347 E
(45) Date of Reissued Patent: May 8, 2012

(54) FLOW REGULATOR

(75) Inventor: Hermann Grether, Müllheim (DE)

(73) Assignee: Neoperl GmbH, Mullheim (DE)

(21) Appl. No.: 29/329,689

(22) Filed: Dec. 19, 2008

Related U.S. Patent Documents

Reissue of:
(64) Patent No.: Des. 550,814
Issued: Sep. 11, 2007
Appl. No.: 29/261,626
Filed: Jun. 15, 2006

U.S. Applications:
(62) Division of application No. 29/235,236, filed on Jul. 29, 2005, now Pat. No. Des. 529,588.

(30) Foreign Application Priority Data

Mar. 21, 2005 (EP) ..... 000330568

(51) LOC (9) Cl. ..... 23-01
(52) U.S. Cl. ..... D23/249
(58) Field of Classification Search ..... D23/213, D23/241, 242, 244–249, 255, 257, 260, 261; 138/37, 40–43; 239/428.5, 552, 553.3, 553.5; 261/19, DIG. 22
See application file for complete search history.

(56) References Cited

U.S. PATENT DOCUMENTS

| | | | | |
|---|---|---|---|---|
| 2,793,016 | A | 5/1957 | Aghnides | |
| 2,797,906 | A | 7/1957 | Aghnides | |
| 2,849,217 | A | 8/1958 | Bachli et al. | |
| 3,363,841 | A | 1/1968 | Aghnides | |
| 4,313,564 | A | 2/1982 | Shames et al. | |
| 4,971,117 | A | 11/1990 | Hendrickson | |
| 5,467,929 | A | 11/1995 | Bosio | |
| D428,114 | S | 7/2000 | Le Bars | |
| 6,126,093 | A | 10/2000 | Grether et al. | |
| 6,152,182 | A | 11/2000 | Grether et al. | |
| 6,354,903 | B1 | 3/2002 | Nelson | |
| 6,892,964 | B2 | 5/2005 | Grether et al. | |
| 6,902,123 | B2 | 6/2005 | Grether et al. | |
| D516,182 | S * | 2/2006 | Buttgen | D23/249 |
| D526,701 | S * | 8/2006 | Grether | D23/249 |
| 7,093,425 | B2 | 8/2006 | Jankowski et al. | |
| D529,140 | S * | 9/2006 | Grether | D23/249 |
| D529,588 | S * | 10/2006 | Grether | D23/249 |
| D536,067 | S * | 1/2007 | Grether | D23/249 |
| D536,069 | S * | 1/2007 | Grether | D23/249 |
| D536,417 | S * | 2/2007 | Buttgen | D23/213 |
| D537,916 | S * | 3/2007 | Buttgen | D23/213 |
| D539,390 | S * | 3/2007 | Grether | D23/249 |
| D539,391 | S * | 3/2007 | Grether | D23/249 |

(Continued)

*Primary Examiner* — Sandra Snapp
(74) *Attorney, Agent, or Firm* — Volpe and Koenig, P.C.

(57) CLAIM

The ornamental design for a flow regulator, as shown and described.

DESCRIPTION

FIG. 1 is a top perspective view of a flow regulator showing my new design;
FIG. 2 is a front elevational view of the flow regulator of FIG. 1;
FIG. 3 is a top plan view of the flow regulator of FIG. 1;
FIG. 4 is a side elevational view of the flow regulator of FIG. 1;
FIG. 5 is a back elevational view of the flow regulator of FIG. 1; and,
FIG. 6 is a bottom plan view of the flow regulator of FIG. 1.
*The broken lines in the drawings are for illustrative purposes only and form no part of the claimed design.*

1 Claim, 3 Drawing Sheets

Matter enclosed in heavy brackets [ ] appears in the original patent but forms no part of this reissue; matter printed in italics indicates the additions made by reissue.

(Amended)

U.S. PATENT DOCUMENTS

| | | | | | |
|---|---|---|---|---|---|
| D539,873 | S | * | 4/2007 | Grether | D23/249 |
| D550,815 | S | * | 9/2007 | Grether | D23/249 |
| D550,816 | S | * | 9/2007 | Grether | D23/249 |
| D550,817 | S | * | 9/2007 | Grether | D23/249 |
| D550,818 | S | * | 9/2007 | Grether | D23/249 |
| D577,416 | S | * | 9/2008 | Buttgen | D23/213 |
| D630,301 | S | * | 1/2011 | Stein | D23/249 |
| 2004/0050968 | A1 | * | 3/2004 | Grether et al. | 239/428.5 |
| 2005/0247805 | A1 | * | 11/2005 | Grether | 239/428.5 |
| 2006/0011748 | A1 | | 1/2006 | Ferrari | |
| 2006/0102750 | A1 | * | 5/2006 | Grether | 239/428.5 |
| 2006/0273203 | A1 | * | 12/2006 | Denzler | 239/428.5 |

* cited by examiner

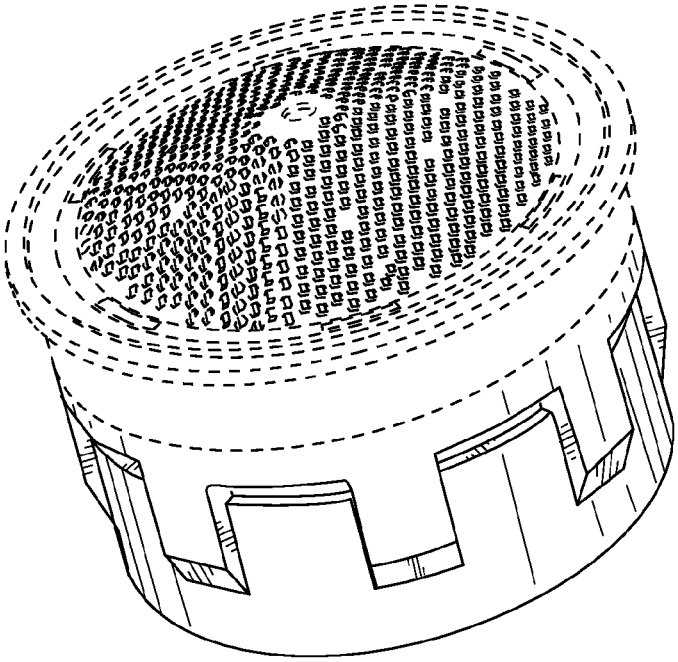
FIG. 1
(Amended)
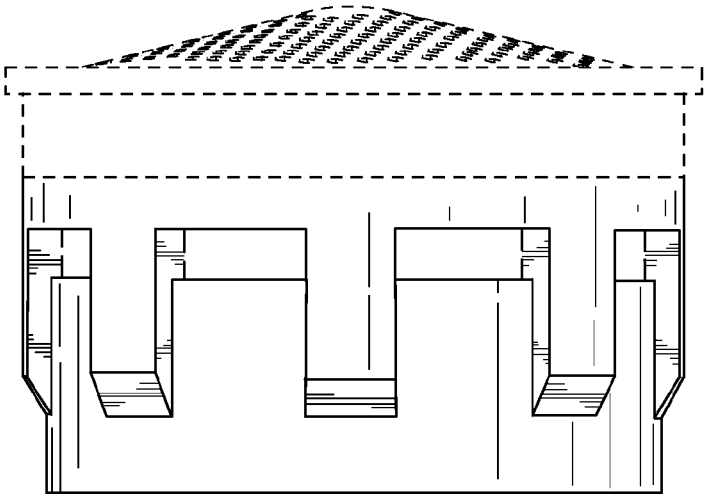
FIG. 2
(Amended)

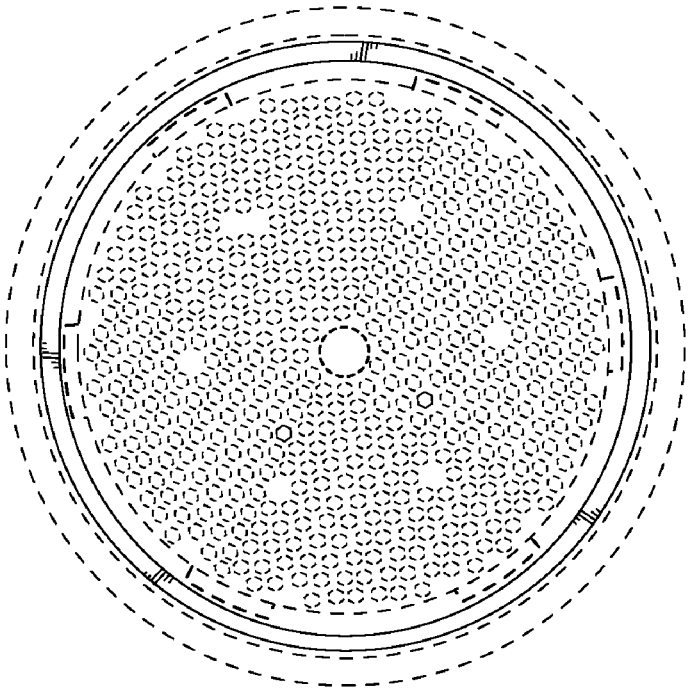
FIG. 3
(Amended)
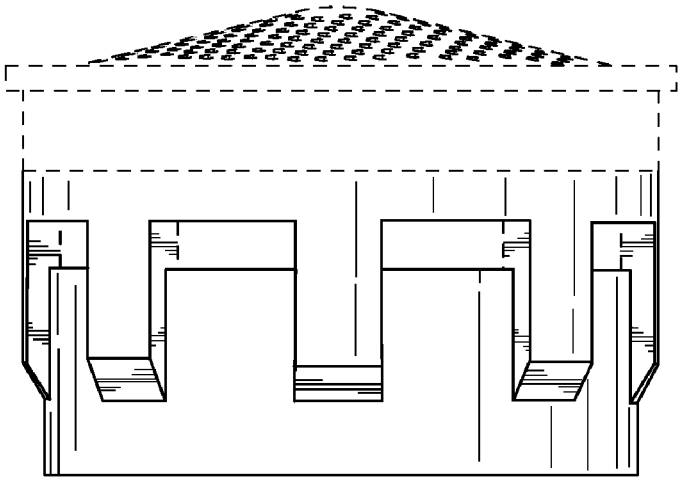
FIG. 4
(Amended)

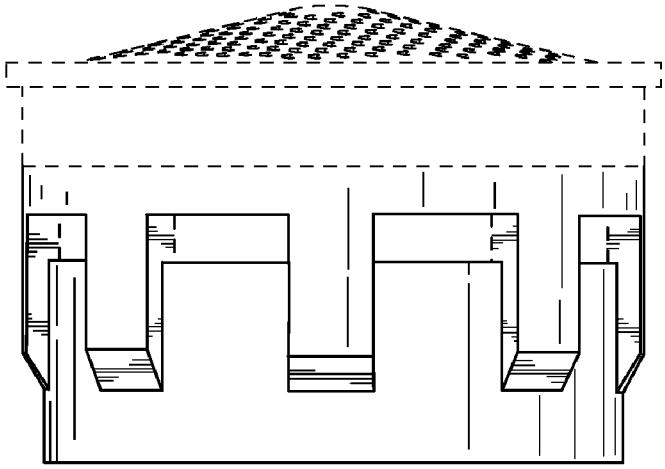
FIG. 5
(Amended)
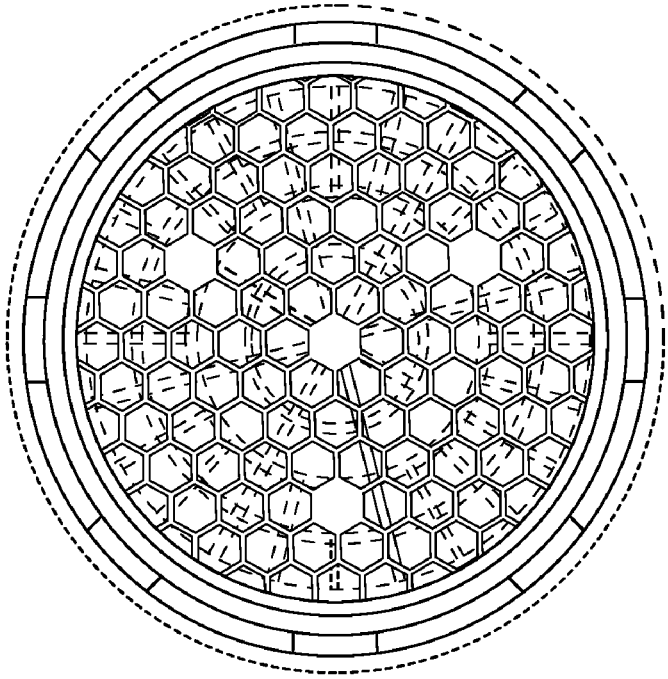
FIG. 6
(Amended)